United States Patent [19]

Solomon et al.

[11] 3,708,797

[45] Jan. 2, 1973

[54] MULTI-CHANNEL LASER RECORDING SYSTEM

[75] Inventors: Kenneth R. Solomon; Alfred E. Mletzko; Donald J. Walker, all of Trumbull, Conn.

[73] Assignee: Columbia Broadcasting System Inc.

[22] Filed: Sept. 24, 1971

[21] Appl. No.: 183,402

[52] U.S. Cl. ..................346/108, 332/7.51, 350/150

[51] Int. Cl. ..................G01d

[58] Field of Search.....346/108, 76 L; 350/150, 157; 332/7.51

[56] References Cited

UNITED STATES PATENTS

| | | | |
|---|---|---|---|
| 3,328,723 | 6/1967 | Giordmaine et al. | 332/7.51 X |
| 3,569,988 | 3/1971 | Schmidt et al. | 178/5.4 |
| 3,579,145 | 5/1971 | De Lange | 332/7.51 |

*Primary Examiner*—Joseph W. Hartary
*Attorney*—Spencer E. Olson

[57] ABSTRACT

A multi-channel laser recording system having an extremely high extinction ratio for achieving selected exposure of a record medium by an actuated channel without spurious exposure by non-actuated channels. A cascaded electro-optical modulator assembly is provided in each system channel and is adaptively biased to maintain an optimum extinction ratio.

18 Claims, 7 Drawing Figures

MULTI-CHANNEL LASER RECORDING SYSTEM

FIELD OF THE INVENTION

This invention relates to recording systems and more particularly to a multi-channel laser recording system having a high extinction ratio.

BACKGROUND OF THE INVENTION

In a laser recording system, a laser beam is modulated in accordance with information to be recorded, the modulated beam being employed usually in conjunction with suitable associated optics to expose a photographic film for impression of data thereon. The recorded information is often in the form of an intensity modulated photographic track scanned on a drum or other suitable record bearing medium, from which information can be reproduced by a similar laser scanner and demodulator. For more elaborate data recording, such as in color recording and graphic plotting, multiple channel systems are employed wherein a laser beam is optically split into a plurality of distinct paths each split beam being separately modulated and processed to convey requisite information to the recording surface. The split beams can be, for example, of different spot sizes to provide recorded line widths of different thicknesses and useful especially in graphic recorders. The split beams can also be used to convey distinct color information for full color recording, such as for color television recording.

Modulators for use in laser systems are of the electro-optical type wherein the plane of polarization of one or more birefringent crystals is varied in response to an applied signal, the varying polarization angle being resolved by an analyzer into an amplitude-varying light beam. Minimum modulator output is provided when the plane of polarization of the output light beam is orthogonal to that of the analyzer, and although, ideally, light transmission should be substantially zero in this condition, actual minimum transmission is at some finite value. The extinction ratio of an electro-optical modulator, that is the ratio of maximum to minimum light transmission, is limited in practice by reason of imperfections in available crystals, crystal misalignment and a critical independence on operating temperature. An extinction ratio of the order of 500:1 is achievable in typical modulators, and while satisfactory for many purposes, is insufficient for other purposes as in multichannel recording. In a plural channel recording system, it is preferable to energize a channel by enabling the associated modulator to allow transmission therethrough, and thus the modulator must possess a sufficient extinction ratio to prevent film exposure in its blocked or off state. Absent a sufficiently high extinction ratio, additional system elements such as mechanical shutters must be employed to prevent spurious film exposure.

SUMMARY OF THE INVENTION

In accordance with the present invention, a multi-channel laser recording system is provided having an extremely high extinction ratio in each channel such that exposure of a record medium is effectively achieved by an actuated channel without spurious exposure by non-actuated channels. A cascaded dynamically calibrated modulator assembly is employed in each channel to provide a multiplicative extinction ratio markedly higher than that obtainable by a single modulator operating alone.

Each modulator assembly includes a polarizer aligned with the principal axis of an input laser beam to provide a linearly polarized beam for transmission through a first electrooptical modulator having its two principal axes disposed at 45° with respect to the linear modulation axis. A second polarizer is disposed at the output end of the first modulator and is oriented orthogonally with respect to the first polarizer and serves as the analyzer for the first modulator and also as the polarizer for a second modulator provided in association therewith. A third polarizer is disposed at the output end of the second modulator and is oriented orthogonally with respect to the second polarizer and serves as the output analyzer of the cascaded assembly.

A modulation voltage from a suitable source is applied to the first and second modulators to produce an elliptical polarization of the light beam passing therethrough, this polarization being resolved into linear polarization by operation of the third polarizer. Thus, a variable intensity output beam is provided in accordance with an applied modulation voltage. During operation, the modulator assembly is calibrated during a portion of each operating cycle to adjust the bias thereof to adaptively maintain an optimum extinction ratio. Calibration is accomplished by associated logic circuitry operative in accordance with sampled modulator output signals to appropriately adjust modulator bias on a dynamic basis and in accordance with actual operating characteristics.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
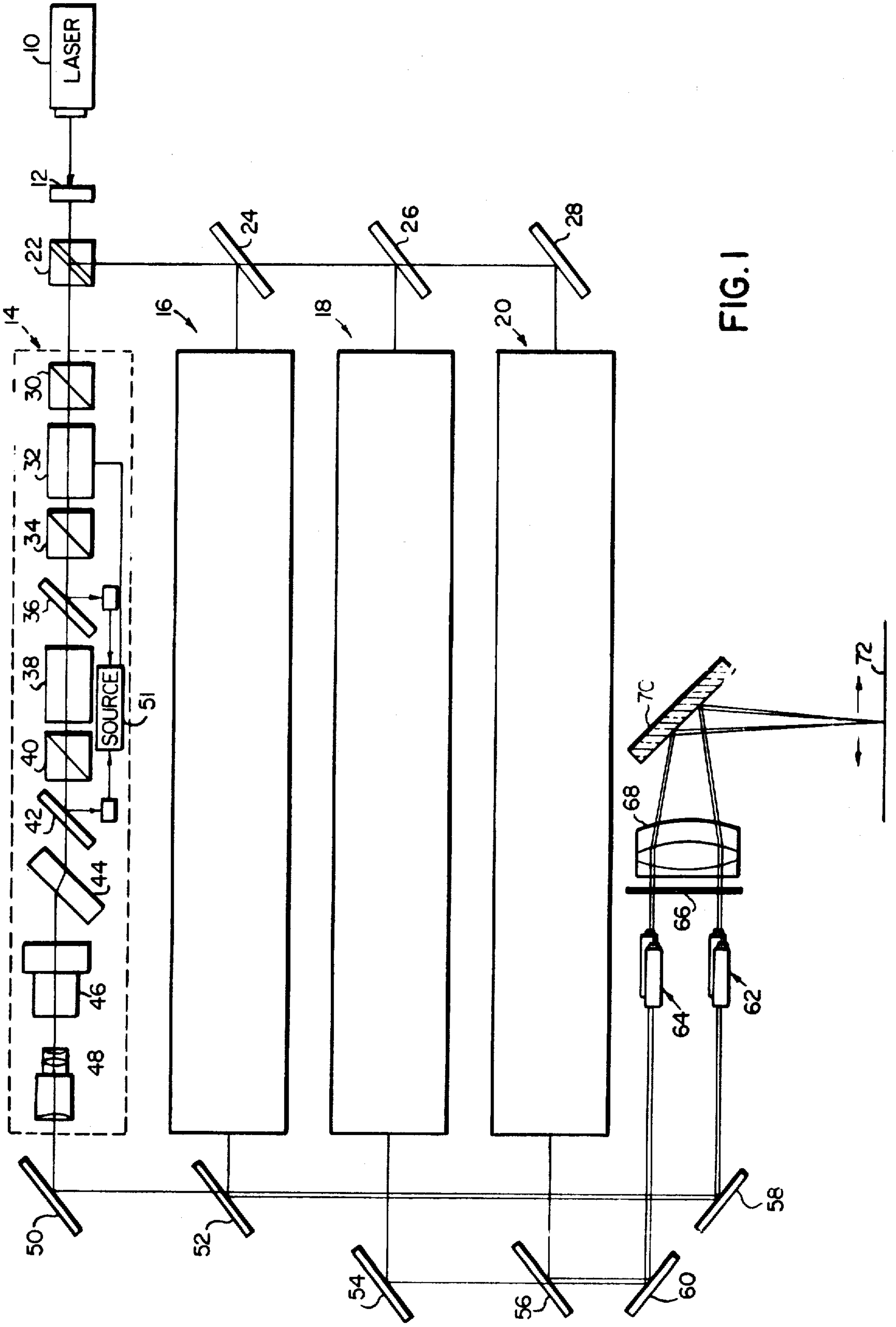
FIG. 1 is a diagrammatic representation of a multi-channel laser recording system according to the invention.

Referring to FIG. 1 there is shown a multi-channel laser recording system which includes a laser source 10 of the continuous wave type and operative at a predetermined wavelength. The laser beam from source 10 is directed through a filter 12 to remove any unwanted spectral components thereof, the filtered beam then being divided into distinct beams for application to respective optical channels 14, 16, 18 and 20.

More particularly, the input filtered beam is directed to a first beam splitter 22, a portion of the beam being transmitted into channel 14, the reflected portion of the beam being directed to a second beam splitter 24. The portion of the beam reflected by beam splitter 24 is directed into channel 16 while the transmitted portion is directed to a third beam splitter 26. The reflected portion of the beam reflected by beam splitter 26 is directed into channel 18, the transmitted portion being directed via a mirror 28 into channel 20.

In the embodiment described, the four channels convey coherent beams of substantially the same frequency which are employed to provide scanning beams of different spot sizes. The invention is also useful, however, to convey multi-color information such as in a color television signal recording system. In this latter embodiment, the elements 22, 24, and 26 are of the dichroic type to divide the input beam into constituent beams of respective color content.

Each of the channels 14, 16 18 and 20 is identical in construction and operation and only a single channel need therefore be described herein. Each channel includes, in light transmitting relationship, a polarizer 30, and electro-optical modulator 32, a second polarizer 34, a beam splitter 36, a second electro-optical modulator 38, a third polarizer 40, a second beam splitter 42, a tilt block 44, an intensity control element 46 and a beam expanding optical system 48. The modulators 32 and 38 are of the same type and are operative to change the orientation of the plane of polarization of the light transmitted therethrough as a function of an applied modulating signal from a suitable signal source 51. The polarizers 30, 34 and 40 are typically Glan Thompson polarizers and serve as the polarizers and analyzers for the modulators 32 and 38. More specifically, polarizer 30 is aligned with the principal axis of the input laser beam, with modulator 32 oriented with its principal axes at 45°, on respective opposite sides of the principal laser axis. The polarizer 34 is oriented orthogonally to the input polarizer 30, and serves as the input polarizer for modulator 38. Modulator 38 is disposed with its principal axes at 45° on respective opposite sides of the principal axis of polarizer 36. The polarizer 40 is oriented with its principal axis orthogonal to that of polarizer 36.

Figure 2A:
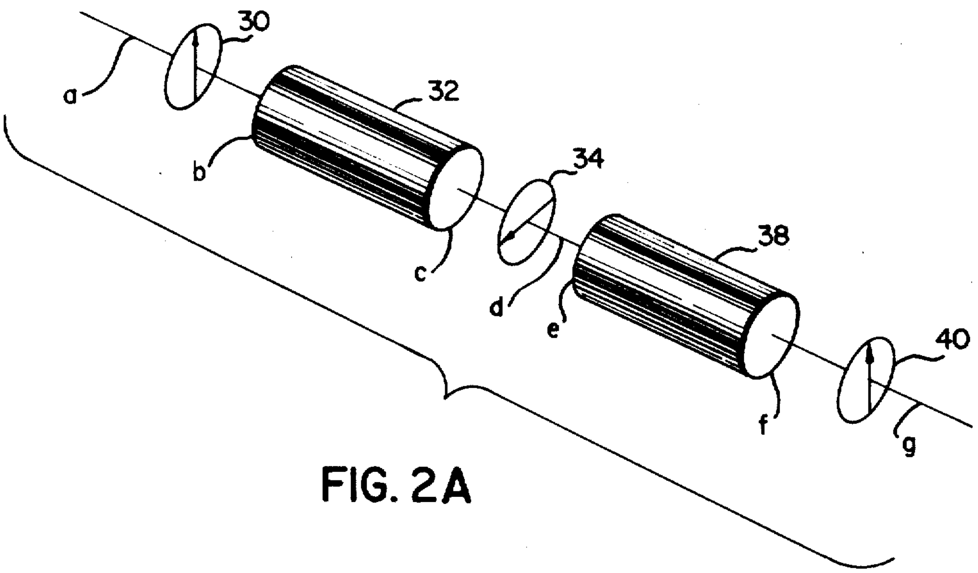
FIG. 2A is a diagrammatic pictorial representation of a cascaded modulator assembly employed in the system of FIG. 1.
Figure 2B:
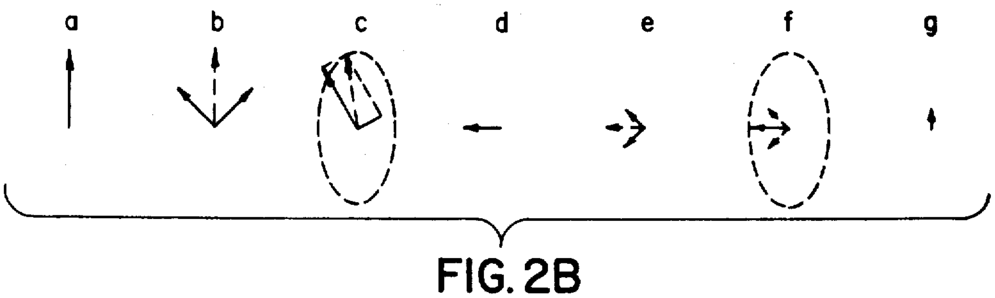
FIG. 2B shows a series of vector diagrams associated with respective points in FIG. 2A and useful in explaining operation of the modulator assembly.

The relative positions of the principal axes of the laser beam, polarizers and modulators are illustrated in FIGS. 2A and 2B, the vector diagrams of FIG. 2B corresponding to the similarly designated points in the pictorial view of FIG. 2A. In the illustrated embodiment, the polarizer 30 is vertically polarized while the polarizer 34 is horizontally polarized. Modulator 32 has its principal axes symmetrically aligned on respective opposite sides of the vertical axis. Polarizer 40 is vertically polarized, and modulator 38 has its principal axes symmetrically disposed on respective opposite sides of the horizontal axis.

Referring to FIG. 2B, the input light beam is linearly polarized along the vertical axis as shown at a. At the input of modulator 32, the beam is polarized, as shown at *b*, along the modulator axes. The modulator provides at its output elliptical polarization *c* which, after passage through polarizer 34, results in linear polarization *d*, orthogonal to the plane of polarization of the input polarizer 30. The polarization *e* at the input of modulator 38 is along the principal axes of this modulator, the modulator providing elliptical polarization *f* which is resolved by polarizer 40 into linear polarization *g* along the vertical axis. The output light beam of the cascaded modulators is thus linearly polarized and of a magnitude which varies as a function of the elliptical polarization provided by the modulators which, in turn, is produced by the applied modulating signals. Maximum light transmission occurs when the vector sum of the elliptically polarized output from modulator 38 is along the axis of polarizer 40, and minimum transmission occurs when this vector sum is orthogonal to the axis of polarizer 40.

The Glan Thompson polarizers exhibit an extremely low ellipticity, of the order of 0.005 percent or better, and thus the crossed or orthogonal disposition of the polarizers 30, 34 and 40 are effective to produce very little transmission. The extinction ratio of the cascaded modulator assembly is the product of the extinction ratios of each modulator, thus providing an extremely high extinction characteristic for the channel in which the cascaded assembly is employed. Extinction ratios of the order of 50,000:1 are achievable by the cascaded modulator. The output light beam from polarizer 40 is linearly polarized along the principal axis of the associated polarizer and of an intensity which varies in accordance with the modulation signals applied by a modulation source 51. The modulated beam is passed through a tilt block 44 which is operative to adjust the displacement of the light beam from the input axis to accommodate the physical arrangement of the optical channels in a particular embodiment.

Since the spot size of the laser beam illuminating the record surface is a function both of intensity and aperture size, the intensity of the light beam of each channel is adjusted by means of an intensity control element 46, which can consist of a combination of a half wave plate and a polarizer which are rotatable with respect to each other, to adjust the intensity of light emanating therefrom. The beam can be enlarged in diameter by means of a beam expanding optical system 48 to provide complete illumination of the respective apertures in an aperture plate 66. Each light beam emerging from the optics 48 of the respective channels is deflected by a respective mirror 50, 52, 54 and 56, the light beams from mirrors 50 and 52 being directed to a mirror 58, the light beams from mirrors 54 and 56 being directed to a mirror 60. The light beams can then be condensed if desired by means of optics 62 and 64 to further adjust the diameter of the respective beams for illumination of the associated apertures in plate 66. Light from the aperture plate is then directed through an objective lens system 68 for focusing via a mirror 70 onto the surface of a record medium 72.

It will be appreciated that the tilt block 44, intensity control element 46, and optical systems 48, 62 and 64 may individually or in combination be unnecessary in a particular physical configuration. The manipulation of light beams to adjust their relative spatial position and beam intensity and size is, of course, well known in the optical art and can be accomplished by a variety of readily implemented means. Similarly, the arrangement and use of mirrors 50, 52, 54, 56, 58 and 60 can vary to suit specific optical paths desired in a particular system. Accordingly, the system depicted in FIG. 1 is intended to be illustrative only.

Operation of the cascaded modulator according to the invention achieves a high extinction ratio for efficient multiple channel recording and an extinction ratio which is maintained in an adaptive manner to minimize the effects of temperature variation. According to a major aspect of the invention, the effects of temperature variations caused, for example, by RF heating of the modulator crystals and ambient temperature variations are minimized on a dynamic basis to minimize resulting drift in the modulator transfer characteristics which can cause variation in the extinction point of the modulator for a given bias voltage.

Figure 3:
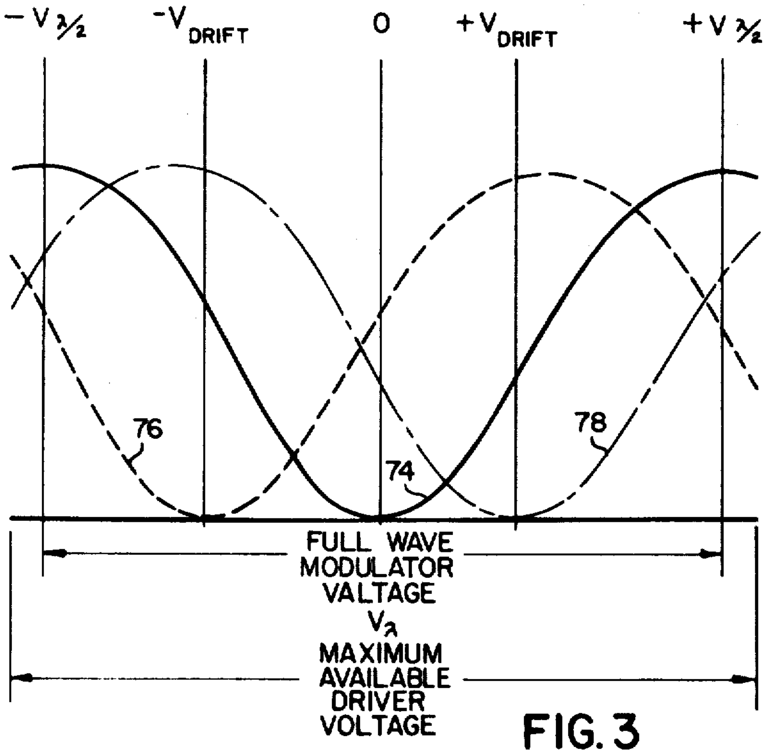
FIG. 3 is a plot of modulator transfer characteristics useful in illustrating modulator bias drift.

Referring to FIG. 3, there is shown curves of modulator transmission versus drive voltage characteristics. The curve 74 symmetrically centered about the 0 volts position represents the ideal modulator characteristic at a normal temperature of operation. Application of a positive or negative voltage will turn on the modulator causing transmission of light, maximum transmission being accomplished with an applied voltage of $\pm V_{\lambda/2}$. In the presence of a unidirectional temperature change, the characteristic curve of the modulator will drift from its intended position. A temperature change of one sense causes drift of the characteristic curve to a position represented in FIG. 3 by curve 76 centered at a voltage $-V_{drift}$. It should be evident that the curve 76 is nonsymmetrically arranged with respect to the overall drive voltage range, the negative turn-on voltage being limited by the position of curve 76. A temperature change of opposite sense causes a drift in the operating curve to the right in the illustrated figure, say to a position represented by curve 78 centered at a voltage $+V_{drift}$. The turn-on voltage in this latter instance is limited in its positive sense. The present invention provides automatic bias correction of both positive and negative sense to compensate for the effect of temperature and to effectively maintain the characteristic curve at its normal operating position.

Figure 4:
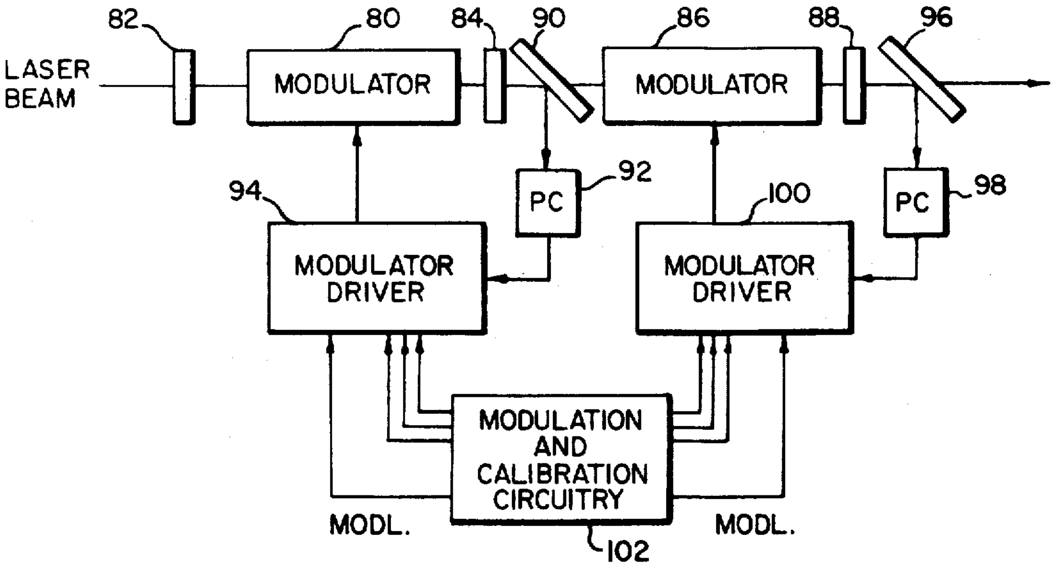
FIG. 4 is a diagrammatic representation of a cascaded modulator assembly and associated dynamic bias correction circuitry according to the invention.

A cascaded modulator according to the invention is depicted in FIG. 4 and includes a first modulator 80 having an input polarizer 82 and an output polarizer 84, the polarizer 84 also serving as the input polarizer for a second modulator 86 having an output polarizer 88. The modulators and associated polarizers are oriented with respect to the plane of the input laser beam and the respective crystal axes as described hereinabove. A beam splitter 90 is employed in light receiving relationship at the output of polarizer 84 and is operative to transmit a portion of the modulated laser beam to modulator 86, and to reflect a portion of the received beam to a photosensor 92 which provides an electrical output signal to a modulator driver 94. A second beam splitter 96 is disposed at the output of polarizer 88 and is operative to reflect a portion of the received modulated beam onto a photosensor 98 which, in turn, provides an electrical output signal to a second modulator driver 100. The signals from photosensors 92 and 98 are representative of modulator output intensity and are employed in the calibration process in a manner to be described. Each driver 94 and 100 is associated with a respective modulator 80 and 86 of the cascaded pair and is operative to provide both modulation and calibration signals to the respective modulator. Modulation and calibration signals are derived from a source 102 coupled to both drivers 94 and 100.

The modulators 80 and 86 of the cascaded assembly are respectively calibrated during successive portions of a calibration interval provided during each operating cycle. During the first portion of a calibration interval, the modulator 80 is calibrated to maximize its extinction ratio, in a manner to be described, and is then turned fully on by a modulation signal from source 102. The modulator 86 is then adjustably biased to its maximum extinction point and both modulators are then turned off to be in condition for activation during the remainder of the operating cycle.

Figure 5:
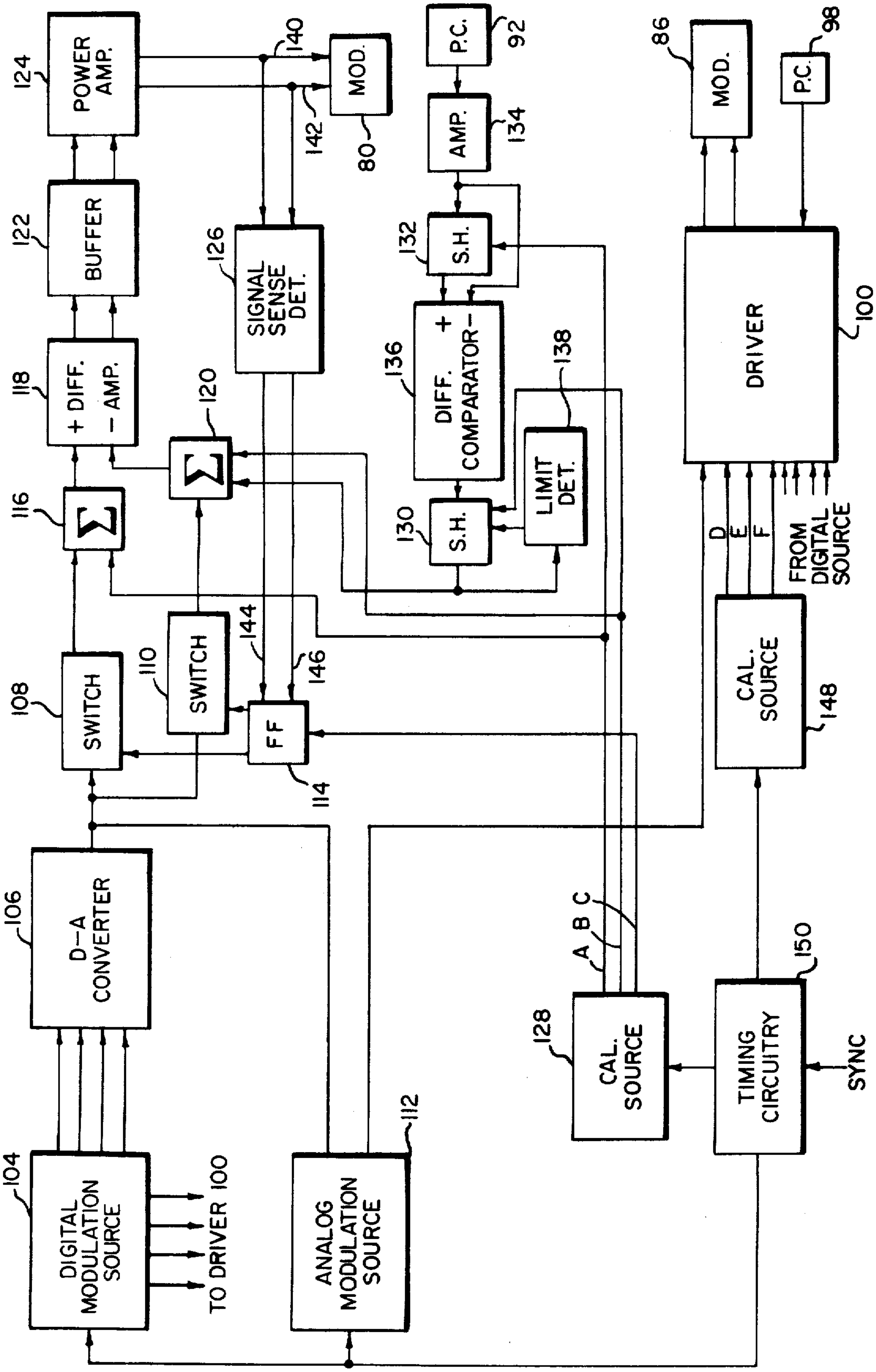
FIG. 5 is a block diagram of the bias correction circuitry of FIG. 4.

The modulator driver circuitry is illustrated in greater detail in FIG. 5. Since both drivers 94 and 100 are identical, only one, driver 94, will be described in detail. Digital input signals from a source 104 are applied to a digital-to-analog convertor 106, the analog output of which is applied to first and second switches 108 and 110. Modulation signals can also be of analog form from a suitable analog source 112 applied directly to switches 108 and 110. The signals are arranged to be in opposite states, one being on while the other is off, both switches 108 and 110 being actuable by signals from a flip-flop 114. The output of switch 108 is applied to the positive input of a differential amplifier 118 via a summing circuit 116. The output of switch 110 is coupled via a summing circuit 120 to the negative input of differential amplifier 118. The output signals from amplifier 118 are applied by way of a buffer 122 to a power amplifier 124, typically a push-pull amplifier, the output of which provides modulation signals to modulator 80. The output signals from power amplifier 124 are also applied to a signal sense detector 126 which, in turn, provides control signals to flip-flop 114.

Photosensor 92 provides an output signal to amplifier 134 which provides an output signal to a sample and hold circuit 132, the output of which is applied to the positive input of a differential comparator 136. The output signal from amplifier 134 is also applied to the negative input of differential comparator 136. The output of comparator 136 is coupled to a sample and hold circuit 130, the output of which is a drive correction signal applied to summing circuit 120. The output signal from sample and hold circuit 130 is also applied to a limit detector 138, the output of which is applied to circuit 130 to adjust the correction voltage thereof, as will be described.

Figure 6:
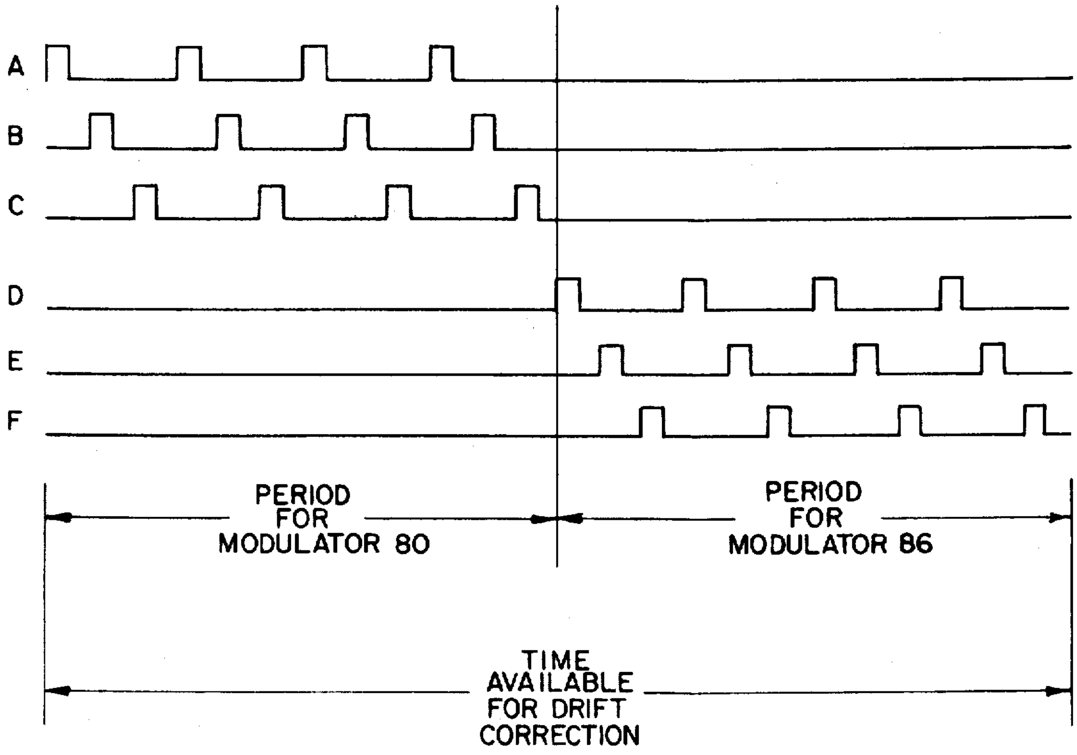
FIG. 6 is a timing diagram of calibration pulses employed in the circuitry of FIG. 5.

Calibration signals are applied to the driver circuitry by a calibration source 128 operative to provide the timed pulses A, B and C depicted in the timing diagram of FIG. 6. As seen in FIG. 6, the pulses A, B and C provided on the respective output lines of source 128 occur in a sequential manner and are typically of ten microseconds duration and ten microseconds separation. A repetitive sequence of these pulses is available during the calibration period of modulator 80, and during calibration one or more pulse sequences is employed to achieve bias correction. The pulses D, E and F which occur during an adjacent time period associated with modulator 86 are provided by a respective calibration source 148 for calibration of modulator 86. As seen in FIG. 5, the pulses D, E and F are applied by source 148 to driver 100 which is associated with modulator 86. The modulator driver 100 is identical to the driver 94 and receives modulator signals from either digital source 104 or analog source 112, and a sample signal from photosensor 98 associated with modulator 86. The modulators 80 and 86 are respectively calibrated during successive portions of a calibration interval and control of the timing sequence to adjust the bias of the respective modulators is governed by timing circuit 150. The timing circuitry can be operative in response to synchronization signals derived from the record medium transport to identify the period during which calibration takes place.

The operation of the modulator driver 94 will now be described. Pulse A from source 128 is applied to sample and hold circuit 132 and is also applied to summing circuit 116 the output of which is applied to the positive input of differential amplifier 118, the output of which, in turn, via buffer 122 and power amplifier 124, is applied to modulator 80 to turn on the modulator. Modulator 80 in response to the applied pulse A produces an output pulse of light which is received by photosensor 92 and which provides a corresponding electrical signal applied via amplifier 134 to sample and hold circuit 132. Pulse A also applied to sample and hold circuit 132 serves as an enable signal in addition to its above described use after the termination of which circuit 132 is operative to retain the amplitude of the signal received from amplifier 134, which is representative of the light output of modulator 80.

Pulse B is next applied to enable sample and hold circuit 130 and is also applied via summing circuit 120, amplifier 118, buffer 122 and power amplifier 124 to modulator 80. Pulse B is applied to the negative input of differential amplifier 118, causing a bias voltage applied to modulator 80 of opposite sense than the bias voltage provided by pulse A. The output of modulator 80 is again sensed by photosensor 92 to provide an electrical signal to amplifier 134 and thence directly to the negative input of comparator 136.

It will be appreciated that for a correctly biased modulator, the application of calibration pulses A and B, of respective opposite sense, to the modulator will cause equal light output by reason of the symmetrical transfer characteristic, such as curve 74 of FIG. 3, of the correctly biased modulator. The positive and negative input signals to differential comparator 136, in this event, are equal and the differential comparator output will apply no effective correction voltage to sample and hold circuit 130 which, in turn, provides no bias correction for modulator 80. If, however, modulator 80 is biased at some point other than its maximum extinction point, causing a non-symmetrical transfer characteristic, as depicted in FIG. 3, the differential comparator 136 senses a difference in the amplitude of its input signals, derived from the photosensor signals representative of modulator output intensity.

Comparator 136 provides an output signal representative of the difference between its input signals to sample and hold circuit 130, the stored voltage of which is adjusted either upwardly or downwardly in accordance with the signals from comparator 136 to cause a corresponding change in modulator bias. The sample and hold circuit 130 includes a large storage capacitor requiring many cycles to reach equilibrium and thereby provides high system resolution, the resolution being defined as the change in bias voltage produced by an applied calibration pulse. The bias correction voltage from sample and hold circuit 130 tends to vary in practice, during normal correction, about the minimum bias point due to slight capacitor discharge in the absence of an input signal to circuit 130, but modulator extinction ratio is not materially affected as the transfer curve is usually somewhat flat at its minimum region. The bias correction voltage produced by sample and hold circuit 130 is applied to summing circuit 120 for application to modulator 80.

The signal sense detector 126 is operative to determine the sense of modulator drift and to orient the drive signals to turn on the modulator in the direction of maximum available drive voltage. Detector 126 functions essentially as a comparator and is operative to determine the relative sense of signals provided to modulator 80 by power amplifier 124, and to provide control signals to flip-flop 114 of a relative sense to determine the states of switches 108 and 110 in order to adjust the effective polarity of drive signals to compensate for the location of the minimum. If the output 140 of amplifier 124 is positive with respect to the output 142, the inputs 144 and 146 applied to flip-flop 114 are, respectively, of high and low binary levels. If, on the other hand, the output 140 is negative with respect to output 142, the inputs 144 and 146 are, respectively, of low and high binary levels.

Flip-flop 114 is enabled by calibration pulse C from source 128 and is operative to switch to its opposite state if the inputs 144 and 146 thereto have changed sense from the previous cycle, which occurs if the power amplifier outputs have reversed polarity. Upon changing state, the output signals from flip-flop 114 are operative to reverse the states of switches 108 and 110 to cause application of drive signals to the opposite polarity input of differential amplifier 118 which, in turn, causes inversion of the signals applied to modulator 80. The modulator is thus driven with signals of a polarity corresponding to the direction of maximum available drive voltage with bias correction being applied of a polarity to compensate for the particular drift sense encountered.

As the modulator temperature changes monotonically, more and more DC voltage is required to offset this change. Over the normally encountered operating temperature range of 0° - 70°C., the modulator can drift over one complete cycle which would require, if the drift were not corrected, twice the normal half wave voltage for proper modulator operation. It is a particular feature of the invention that a number of cycles of modulator drift are readily corrected by use of a driver capable of only slightly more than one full wave of modulator voltage. Referring again to FIG. 5, the limit detector 138 is operative to detect when the bias correction voltage from circuit 130 has reached a voltage level $\pm V_0$, which is the bias correction voltage corresponding to a voltage slightly greater than the modulator half wave voltage $V_{\lambda/2}$. Upon detection of the voltage level $\pm V_0$, detector 138 is operative to discharge the capacitor of sample and hold circuit 130 and to recharge the capacitor to a voltage one cycle back against the direction of bias drift. The limit detector 138 is thus operative to determine when bias correction has been made for a one half cycle drift and to adjust the bias to a one half cycle drift of opposite sense to enable further bias correction.

By use of the novel dynamically corrected cascaded modulator assembly in each channel, the several channels of the laser recorder shown in FIG. 1 are operative to selectively illuminate a record surface without interference from non-energized channels. It will be appreciated that the cascaded modulator assembly is also useful in other than the illustrated laser recording system and can be employed in many systems requiring a high extinction ratio optical modulator adaptively corrected for bias drift due to temperature. Accordingly, the invention is not to be limited by what has been particularly shown and described except as indicated in the appended claims.

What is claimed is:

1. In a multi-channel laser recording system having a source of coherent energy, means for dividing said energy into a plurality of constituent beams, and means for directing each of said constituent beams onto a surface of a record medium, modulation means for each of said beams, each modulation means including:

a first polarizer having a principal axis in alignment with the polarization axis of an input constituent beam;

a first electro-optical modulator having its principal axes symmetrically aligned on respective opposite sides of the principal axis of said first polarizer;

a second polarizer in light transmitting relationship at the output end of said first modulator and having its principal axis orthogonal to that of said first polarizer;

a second electro-optical modulator having its principal axes symmetrically aligned on respective opposite sides of the principal axis of said second polarizer;

a third polarizer in light transmitting relationship at the output end of said second modulator and having its principal axis orthogonal to that of said second polarizer;

means for receiving energy transmitted by each of said first and second modulators and for producing in response thereto respective electrical signals representative of the intensity of light transmitted by said respective modulators; and means operative in response to said electrical signals to adjust the bias of said first and second modulators to compensate for the effects of temperature drift therein and maintain a maximum extinction ratio.

2. The invention according to claim 1 wherein said bias adjusting means includes:

means for applying a first calibration signal to each of said first and second modulators to cause energization thereof by drive signals of one polarity;

means for applying a second calibration signal to each of said first and second modulators to cause energization thereof by drive signals of opposite polarity; and means operative in response to said respective electrical signals to provide a correction signal for each of said modulators to compensate for the effects of bias drift.

3. The invention according to claim 1 wherein said bias adjusting means includes first and second bias correction circuits each associated with a respective one of said first and second modulators and each operative sequentially to adjust the bias of a respective modulator.

4. The invention according to claim 3 wherein each of said first and second bias correction circuits includes:

a source of time sequentially related calibration pulses;

means for applying a first calibration pulse to the associated modulator to cause energization thereof by drive signals of one polarity;

means for applying a second calibration pulse to said associated modulator to cause energization thereof by drive signals of opposite polarity;

a first sample and hold circuit enabled by said first calibration pulse and operative to store a potential representative of the magnitude of the electrical signal produced by said energy receiving means;

a differential comparator having one input terminal coupled to the output of said first sample and hold circuit and a second input terminal coupled to said energy receiving means;

a second sample and hold circuit enabled by said second calibration pulse and operative to receive an input signal from said differential comparator and to store a potential representative of the difference between the magnitudes of input signals applied to said differential comparator; and means for deriving from the stored potential of said second sample and hold circuit a correction signal for said associated modulator.

5. The invention according to claim 4 wherein each of said first and second bias correction circuits includes:

means for sensing the relative polarity of drive signals applied to said associated modulator and for providing control signals in response to said signal sense determination; and switching means operative in response to said control signals to cause application of drive signals to said associated modulator of a polarity corresponding to the direction of maximum available drive voltage.

6. The invention according to claim 5 wherein each of said first and second bias correction circuits includes:

a limit detector operative to detect when the correction signal from said second sample and hold circuit has reached a predetermined level representative of modulator half wave voltage and to apply a signal to said second sample and hold circuit to adjust the stored potential thereof to a selected value to permit bias correction for multicycle drift.

7. A cascaded electro-optical modulator comprising:

a first polarizer having a principal axis in alignment with the polarization axis of an input beam;

a first electro-optical modulator having its principal axes symmetrically aligned on respective opposite sides of the principal axis of said first polarizer;

a second polarizer in light transmitting relationship at the output end of said first modulator and having its principal axis orthogonal to that of said first polarizer;

a second electro-optical modulator having its principal axes symmetrically aligned on respective opposite sides of the principal axis of said second polarizer;

a third polarizer in light transmitting relationship at the output end of said second modulator and having its principal axis orthogonal to that of said second polarizer;

means for receiving energy transmitted by each of said first and second modulators and for producing in response thereto respective electrical signals representative of the intensity of light transmitted by said respective modulators;

means for applying drive signals of either positive or negative polarity to each of said first and second modulators;

means for applying calibration signals to each of said modulators of both positive and negative sense to cause production by said energy receiving means of respective electrical signals representative of the intensity of light transmitted by said respective modulators in response to said calibration signals; and means operative in response to said respective electrical signals ro provide bias correction signals to respective ones of said modulators to compensate for the effects of temperature drift therein.

8. The invention according to claim 7 wherein said means for applying drive signals includes for each of said first and second modulators:

a differential amplifier having positive and negative input terminals and coupled to a power amplifier operative to apply said drive signals to an associated modulator;

and wherein said means for applying calibration signals includes for each of said first and second modulators:

a source of time sequentially related calibration pulses;

means for applying a first calibration pulse to the positive input terminal of said differential amplifier; and means for applying a second calibration pulse to the negative input terminal of said differential amplifier;

and wherein said bias correction means includes for each of said first and second modulators:

means for storing a potential representative of the difference in the intensity of light transmitted by said associated modulator in response to said first and second calibration pulses; and means for applying a correction signal derived from said stored potential to said differential amplifier for bias adjustment of said associated modulator.

9. The invention according to claim 8 wherein said bias correction means for each of said first and second modulators includes:

means for determining the relative sense of drive signals applied to an associated modulator;

means operative in response to said sense determination to provide control signals representative of said relative sense; and switching means operative in response to said control signals to cause application of drive signals to said associated modulator of a polarity corresponding to the direction of maximum available drive voltage.

10. The invention according to claim 8 wherein said bias correction means for each of said first and second modulators includes:

means operative to detect when said bias correction signals have reached a predetermined level representative of modulator half wave voltage and to adjust the stored potential of said storage means to a selected value to permit bias correction for multi-cycle drift.

11. The invention according to claim 10 wherein said potential storing means comprises a sample and hold circuit enabled by one of said calibration signals.

12. The invention according to claim 7 wherein said means for applying drive signals for each of said first and second modulators includes:

a differential amplifier having positive and negative input terminals;

a power amplifier coupled to the output of said differential amplifier and operative to apply positive and negative drive signals to an associated modulator; and switching means for selectively applying signals to one of the input terminals of said differential amplifier to thereby cause application of drive signals of predetermined polarity to an associated modulator.

13. The invention according to claim 12 wherein said switching means includes:

first and second switches each operative to receive an input signal and each having an output coupled to a respective input terminal of said differential amplifier; and control means operative to selectively energize one of said first and second switches in accordance with the relative sense of drive signals applied to an associated modulator.

14. The invention according to claim 13 wherein for each of said first and second modulators said means for applying calibration signals includes:

a source of time sequentially related calibration pulses;

means for applying a first calibration pulse to the positive input terminal of said differential amplifier;

means for applying a second calibration pulse to the negative input terminal of said differential amplifier; and means for applying a third calibration pulse to said control means to enable operation thereof.

15. A cascaded electro-optical modulator comprising:

a first polarizer having a principal axis in alignment with the polarization axis of an input coherent beam;

a first electro-optical modulator having its principal axes symmetrically aligned on respective opposite sides of the principal axis of said first polarizer;

a second polarizer in light transmitting relationship at the output end of said first modulator and having its principal axes orthogonal to that of said first polarizer;

a second electro-optical modulator having its principal axes symmetrically aligned on respective opposite sides of the principal axis of said second polarizer;

a third polarizer in light transmitting relationship at the output end of said second modulator and having its principal axis orthogonal to that of said second polarizer;

photosensor means in light receiving relationship with each of said first and second modulators and for producing in response to received light respective electrical signals representative of the intensity of light transmitted by said respective modulators;

means sequentially operative to provide to said modulators calibrated drive signals of both positive and negative polarity to energize respective modulators;

means operative in response to said respective electrical signals to determine a difference between the light transmission caused by said calibrated drive signals of positive and negative polarity;

means operative in response to said difference to provide a correction signal to said respective modulators to compensate for the effects of temperature drift therein;

means for determining the relative sense of drive signals applied to said respective modulators and to provide control signals corresponding to said sense determination;

means operative in response to said control signals to cause reversal of the polarity of drive signals applied to said respective modulators when said signal sense determining means detects a reversal of relative sense in said drive signals; and means for determining when said correction signals are of a magnitude equal to a level representative of bias correction for a predetermined bias drift and operative upon such level determination to alter the magnitude of said correction signal to cause bias correction of opposite sense to that of the bias drift.

16. A multi-channel laser recording system comprising:

a source of laser energy;

means for dividing said energy into a plurality of constituent beams;

means for directing each of said constituent beams onto a surface of a record medium;

means for modulating each of said beams, each modulation means including:

a first polarizer having a principal axis in alignment with the polarization axis of an input coherent beam;

a first electro-optical modulator having its principal axes symmetrically aligned on respective opposite sides of the principal axis of said first polarizer;

a second polarizer in light transmitting relationship at the output end of said first modulator and having its principal axes orthogonal to that of said first polarizer;

a second electro-optical modulator having its principal axes symmetrically aligned on respective opposite sides of the principal axis of said second polarizer;

a third polarizer in light transmitting relationship at the output end of said second modulator and having its principal axis orthogonal to that of said second polarizer;

photosensor means in light receiving relationship with each of said first and second modulators and for producing in response to received light respective electrical signals representative of the intensity of light transmitted by said respective modulators;

means sequentially operative to provide to said modulators calibrated drive signals of both positive and negative polarity to energize respective modulators;

means operative in response to said respective electrical signals to determine a difference between the light transmission caused by said calibrated drive signals of positive and negative polarity;

means operative in response to said difference to provide a correction signal to said respective modulators to compensate for the effects of temperature drift therein;

means for determining the relative sense of drive signals applied to said respective modulators and to provide control signals corresponding to said sense determination;

means operative in response to said control signals to cause reversal of the polarity of drive signals applied to said respective modulators when said signal sense determining means detects a reversal of relative sense in said drive signals; and means for determining when said correction signals are of a magnitude equal to a level representative of bias correction for a predetermined bias drift and operative upon such level determination to alter the magnitude of said correction signal to cause bias correction of opposite sense to that of the bias drift.

17. In a coherent energy modulation system having at least one electro-optical modulator adapted to transmit energy therethrough in accordance with applied drive signals, a method for dynamically maintaining an optimum extinction ratio and comprising the steps of:

applying a calibration signal of one polarity to said modulator;

applying a calibration signal of opposite polarity to that of said first calibration signal to said modulator;

deriving electrical output signals representative of the magnitudes of energy transmitted by said modulator in response to said first and second calibration signals;

determining the difference between the magnitudes of said electrical output signals;

storing a representation of said magnitude difference;

deriving from said stored representation a bias correction signal for compensation of the effects of temperature drift in said modulator;

determining the relative sense of drive signals applied to said modulator;

deriving control signals in response to said relative sense determination; and causing the inversion of said drive signals applied to said modulator upon polarity reversal of said drive signals.

18. The invention according to claim 17 wherein said electro-optical modulator is a cascaded modulator and said method is sequentially performed for each modulator of the cascaded assembly.

* * * * *